United States Patent
Govindaraj et al.

(10) Patent No.: US 6,901,298 B1
(45) Date of Patent: May 31, 2005

(54) SAVING AND RESTORING CONTROLLER STATE AND CONTEXT IN AN OPEN OPERATING SYSTEM

(75) Inventors: Subbian Govindaraj, South Euclid, OH (US); Shelly Lynn Urdaneta, Lyndhurst, OH (US); Steven Mark Cisler, Franklin, WI (US); Mark Joseph Weiland, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 242 days.

(21) Appl. No.: 10/261,649

(22) Filed: Sep. 30, 2002

(51) Int. Cl.⁷ .............................. G06F 9/00; G06F 13/00
(52) U.S. Cl. .......................... 700/21; 700/79; 700/293; 713/300; 713/340
(58) Field of Search .............................. 700/21, 79, 80, 700/82, 286, 293; 714/1, 3, 5, 6, 15, 22; 713/300, 340

(56) References Cited

U.S. PATENT DOCUMENTS

| | | | | |
|---|---|---|---|---|
| 4,484,287 A | * | 11/1984 | Gamo et al. ............... | 700/177 |
| 4,680,706 A | * | 7/1987 | Bray ........................... | 700/293 |
| 5,075,870 A | * | 12/1991 | Kojyo et al. ................ | 700/254 |
| 5,170,109 A | * | 12/1992 | Yanagita et al. ......... | 318/568.1 |
| 5,414,861 A | * | 5/1995 | Horning ...................... | 365/229 |
| 5,519,831 A | * | 5/1996 | Holzhammer ................ | 714/22 |
| 5,530,877 A | * | 6/1996 | Hanaoka ..................... | 713/300 |
| 5,557,777 A | * | 9/1996 | Culbert ......................... | 713/2 |
| 5,765,001 A | * | 6/1998 | Clark et al. ................. | 713/340 |
| 6,601,212 B1 | * | 7/2003 | Guha et al. ................. | 714/776 |

* cited by examiner

*Primary Examiner*—Emanuel Todd Voeltz
(74) *Attorney, Agent, or Firm*—Amin & Turocy LLP; R. Scott Speroff

(57) ABSTRACT

The present invention relates to a system and methodology for saving and restoring controller state and context in an industrial controller. In an aspect of the invention, the industrial controller has a memory module having at least RAM and flash memory. Savings of the state and context is accomplished through writing an image of the RAM to flash memory prior to the power being removed from the RAM. Restoring is accomplished through writing the RAM image in the flash memory back to the RAM after the RAM has been energized.

37 Claims, 16 Drawing Sheets

SAVING AND RESTORING CONTROLLER STATE AND CONTEXT IN AN OPEN OPERATING SYSTEM

TECHNICAL FIELD

The present invention relates generally to industrial control systems, and more particularly to a system and method that saves and restores state(s) of an industrial controller system.

BACKGROUND OF THE INVENTION

A programmable logic controller ("PLC" or "controller") is commonly used in industry for controlling electrical, mechanical, hydraulic and pneumatic processes and equipment by providing functionality of relays, contactors, counters, timers and other electro-mechanical devices, for example. The PLC encapsulates such functionality through hardware and software, rendering the controller a box of virtual relays, contactors, counters and timers with behavior that is determined through user written, application specific code. A benefit of controllers to industry is they afford for semi-automation or automation of factories and are cost effective, require low maintenance, are compact and flexible.

A typical controller includes input/output (I/O) connections for interfacing with devices, a microprocessor, memory and application code. The following is a simple example operation relating to a controller to provide some context in connection with controllers—such example is not all encompassing as can be appreciated by one of ordinary skill in the art. The input of the I/O interfaces with real world analog and digital signals through sensors, switches, etc to determine state(s) (e.g., on/off) relating to a process. The input data can be stored in memory and used by the application code to determine a next state. Application code is typically user written and executed in a sequential manner. The next state can be saved to memory and conveyed to an instrument that the controller is governing through the output interface.

A single controller can be used to control an individual (one) device and multiple devices, and multiple controllers can be used to control an individual device and multiple devices. In this respect, control of equipment in a plant may be divided amongst many controllers with each controller performing a particular task and operating as its own functional block or module but integral to the overall control of the plant. Different combinations of modules may be selectively linked together on a backplane or connected together through one or more communication links. User Interfaces are often employed to interact with controllers for writing and downloading user programs. In addition, control processes are often monitored from the interfaces, wherein an operator may adjust one or more of the controller's variables during the control process.

A controller differs from a conventional (e.g., general purpose) computer in several aspects. Unlike conventional computers, an industrial controller is designed to operate in an industrial environment with varying temperatures, humidity, pressure, electrical noise, mechanical vibration and particulates in the air. Moreover, the controller is designed for easy access and interfacing given the often harsh operating environment the controller is exposed to—this includes installation, maintenance and troubleshooting by plant personnel. Controllers typically are associated with a plurality of modules (e.g., control module(s), interface module(s), I/O module(s), and such modules are designed for quick swapping and replacement—and in some cases hot swapping. Controllers typically do not have processing power to compute complex instructions simultaneously. They usually execute single programs in sequential order.

Controllers are generally customized to a particular process they are respectively controlling through control software that is stored in the controller's memory and by changing the hardware configuration of the controller itself. The ability to re-configure the hardware economically is provided by dividing the controller into a number of functional modules each performing a different function. Lastly, a considerable distance may separate the various components of a controller over a factory or manufacturing plant. The separated functional modules can communicate through messages transmitted over the communication links. Bridges may join multiple communication links in order to translate messages between links according to corresponding protocols.

A present downfall to current industrial controller state of the art is the technique used to maintain controller state and context due to a loss of power. In the current state of the art, controller RAM is cleared upon initialization or boot-up, and power loss elicits a system boot. This means that when power is removed from the controller, substantially all running applications and the operating system (OS) state are lost. A potential solution is to provide time based saves. However, recovery using a time based save returns the controller to the state of the last save which may not be the last state the controller was in just prior to power loss. In other words, any changes that occurred between the last save and the power outage are lost. Another existing solution is to provide a power supply backup to keep the controller and the RAM energized. Controllers based on proprietary and/or closed operating systems and hardware employ this technique. However, battery backup becomes a problem for controllers based on open operating systems with large memory footprints because of the amount of the time it takes to save the state and context. In order to allow enough time, larger and more expensive secondary power sources are required.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology for saving and restoring industrial controller state and context in an open operating system. The subject invention provides for writing controller content stored in its RAM to flash memory prior to removing power from the RAM, which saves the state and context of the controller and mitigates loss of valuable controller state and context data as compared to conventional schemes. During restoring of power to the controller, the controller data (e.g., state and context information) is copied/moved from the flash memory back to the RAM so as to restore the state and context of the controller.

In one embodiment of the subject invention, the controller is built around an open operating system that is always on and has hibernate functionality incorporated therein—suspend and resume functionality. Hibernate functionality is exploited during suspend and resume operations so that saving and restoring the state and context can be performed. Operating systems like Windows-CE that have hibernate functionality typically only require that applications and drivers be written at standard level interfaces for handling suspend and resume. For this embodiment, after entering a suspend state, a routine is implemented that writes the content of RAM to flash memory. Once the write is complete, the operating system can remove power from the controller. When a signal for resuming operation is sensed, the operating system brings the system out of suspend. If the RAM was cleared or if the RAM content is invalid, then a routine is implemented that writes the content of flash memory to RAM. If the content of the RAM is valid, then the information in the flash memory is not used. Once the RAM contains valid state and context information, control is given back to the operating system for normal operation.

In another embodiment, the controller is built around an open operating system where power is removed upon powering down. Bringing the controller back up requires a boot of the system, and therefore a clearing of the RAM. For this embodiment, the controller uses a battery backup to keep the controller and RAM energized long enough so that the RAM content can be written to flash memory. There is a significant difference in power consumption between providing power backup to maintain power to the controller and providing battery backup to keep the RAM energized long enough to save its content to the flash memory. This reduction in power translates to a reduction in cost. When the system is powered up through a cold (hard) boot, the RAM can be cleared if required in the normal boot process. The flash memory can then be written to RAM in order to restore the system back to the state just prior to the power down.

In another embodiment, it can be appreciated that the controller context and state needs to be saved during an abrupt power outage. For this embodiment, the open operating system may or may not have hibernate functionality. Bringing the controller back up requires a boot of the system and a clearing of the RAM. Upon sensing power loss, battery backup is employed to keep the controller and RAM energized long enough so that the RAM content can be written to flash memory. When the system is powered up through a cold (hard) boot, the RAM can be cleared as required in the normal boot process. The flash memory can then be written to RAM in order to restore the system back to the state just prior to the terminal power loss.

In another embodiment, MRAM can be utilized in the memory. MRAM is high-speed memory that does not need power to persist. In one aspect, the entire memory consists of MRAM and is able to maintain the controller context and state. In another aspect, a plurality of memory types is used with at least one type being MRAM. Controller context and state can be maintained by keeping the current context and state in MRAM. This may include running applications and saving data and variables in MRAM.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
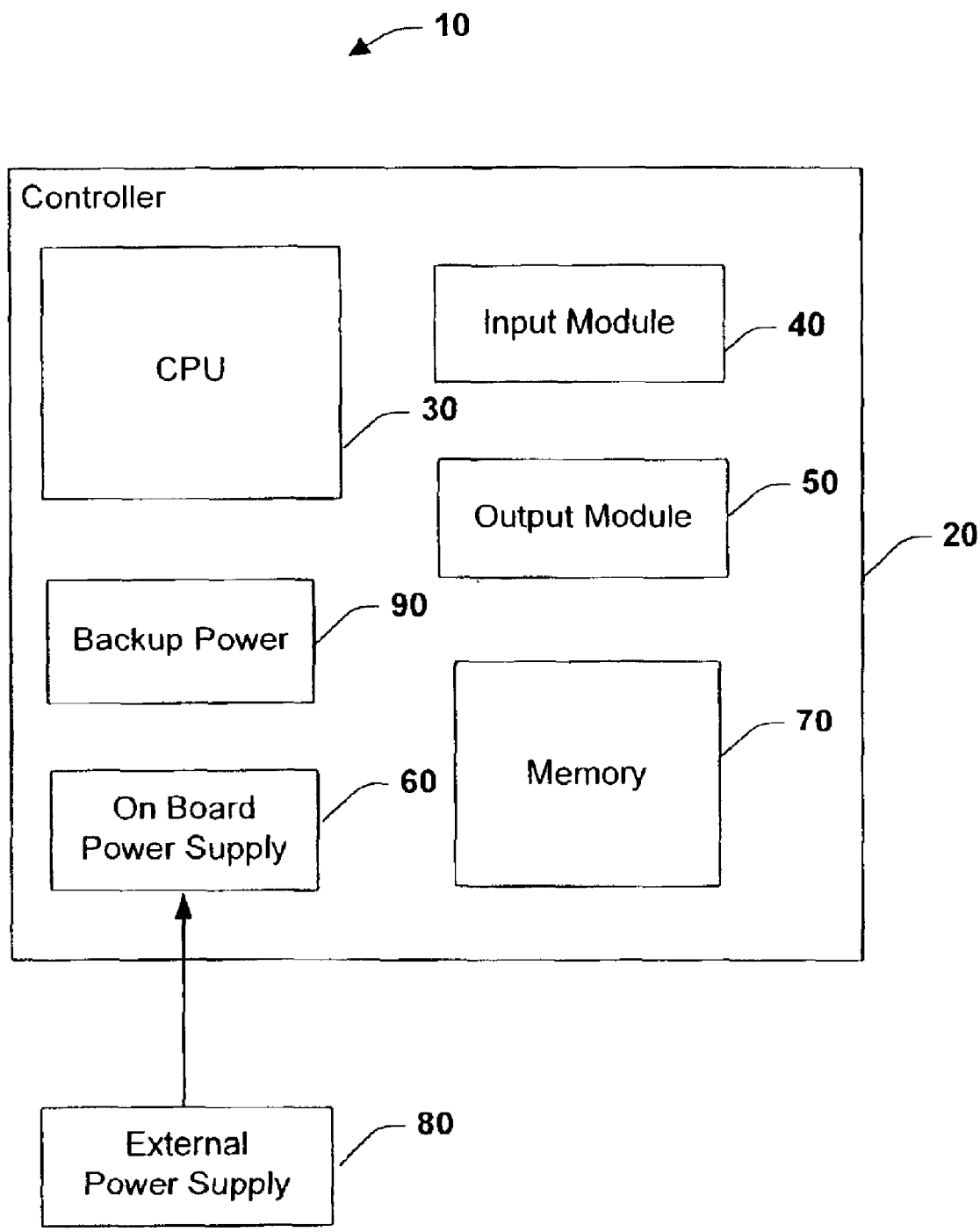
FIG. 1 is schematic block diagram of an exemplary industrial controller in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Accordingly, it is to be appreciated that the subject invention can employ probabilistic determination (e.g., neural networks, Bayesian networks, expert systems, Hidden Markov models, . . . ) and/or prognostic techniques to infer power state conditions so as to proactively attend to retention of valuable controller state and context information in connection with the subject invention.

The present invention relates to a system and methodology for saving and restoring industrial controller state and context in an open operating system. A memory is provided that contains at least a volatile memory bank and a non-volatile memory bank where the amount of the non-volatile memory is at least the size of the volatile memory plus overhead. The volatile memory can further be divided to include at least a RAM memory portion. The RAM memory can be, for example, SRAM, DRAM, SDRAM, FPRAM and EDORAM, or another high-speed volatile type of memory that can be used with industrial controllers. The RAM memory can by utilized to store runtime applications like user programs, state, context variables, data tags and tables. The RAM, being volatile, requires a source of power to persist its contents. Without the power source, the RAM will loose its storage or holding ability and its contents could be lost.

Power source loss could be due to powering the system down through a normal power down procedure or through a power outage like removal of the controller from the backplane that supplies the power, disengaging the power cord or exceeding the lifetime of a battery backup. The non-volatile memory can be further divided to include at least a flash memory portion. Other types of memory that may be present include ROM, CMOS, BIOS and PROM that may be utilized for storing system initialization information. Unlike volatile memory, non-volatile memory has the advantage that it does not require power to retain its contents. An aspect of the present invention exploits this advantage by utilizing the non-volatile memory to store information that is desirable to persist such as the state and context of the controller. By doing so, the controller can always be returned to the current state and context. Controller state and context can be preserved by writing an image of the RAM to the flash memory upon bringing the controller down through controlled hibernation, normal power shutdown and sudden loss of power.

In recent years, with the advance of the semiconductor manufacture technology, storage capacities of flash memories have become increasingly larger. With the increase in the storage capacity, the use of a memory device having a flash memory as a storage medium in an industrial controller becomes readily apparent—the flash being advantageously small in size and low in power consumption. A flash memory is a non-volatile, rewritable semiconductor memory device that allows an erase operation of data one section at a time. The flash memory integrates storage elements at a high density, and, in order to enable a fast-speed data transmission and reception, specifies a sector address, and reads, erases, and writes (programs) a certain amount of data one sector at a time. In the present specification, the term "program" refers to setting the state of a memory cell in a flash memory to correspond to the value of either 1 or 0 according to data provided from outside. As the capacity of the flash memory increases in size, the sector capacity, the unit of data the flash memory reads out at one time, tends to increase in size as well. For instance, in an AND-type flash memory of 256 Mbits, the sector capacity is 2048 bytes.

The system and methodology employ a robust and cost-effective philosophy. Unlike time based saves and user initiated saves (e.g., saving to EEPROM), the state and context will be the state and context just prior to power removal since power is maintained until the state and context are saved. A time based save will allow the system to be restored to the last saved state and context. However, this will probably not be the current state and context unless the save interval, or time between saves, is small (e.g., 100 milliseconds). The price of the small save interval is slower running applications since the applications will be competing with the save for CPU cycles. Similar to time based saves, a restore from a user initiated state and context save will probably not be the state and context just prior to power loss. The save is more controlled than a time based save, but the interval between saves is usually longer.

Maintaining back up power to persist RAM has a drawback in that if the back up fails, then the state and context can be lost, and depending on the memory requirements, the back up power supply can be expensive. In an aspect of the present invention, the state and context saved is the state and context just prior to system hibernate and shutdown (e.g., the current state and context). In addition, the amount a power required to persist the RAM long enough for a write to flash memory is significantly less. Depending on the amount of memory and the technology (e.g., compact flash, memory sticks . . . ) implemented, the amount of time could range from milliseconds to a couple of seconds. Techniques utilizing on-board power such as a capacitor and AA battery can be utilized instead of an UPS.

FIG. 1 illustrates an industrial control system 10 in accordance with an aspect of the current invention. The system 10 includes a basic controller 20. One skilled in the art will appreciate that controllers are tailored to specific applications and may be more or less complex than the one shown. In addition, one skilled in the art can conceptualize that the controller may be used in conjunction with others controllers residing on the same backplane or linked across networks. In addition to the controller 20, the system 10 includes an external power supply 80. The system 10 can be used in the control of industrial and manufacturing processes, methods, plants, machines, equipment, devices, instruments and apparatuses. The control may enable partial or complete automation depending on the needs of the industry.

The controller 20 includes a CPU 30 (processing unit), I/O (Input 40 and Output 50), on board power 60, on board backup power 90, and memory 70. It is appreciated that the controller includes a variety of other components (hardware and software) in order to affect its desired functionality. However, for sake of brevity and to allow the reader to focus on the subject invention, discussion with respect to superfluous components has been omitted. The CPU 30 reads and writes data, performs operations and executes instructions in connection with operation of the controller 20. I/O is employed to convey information bi-directionally with the controller and the outside industrial automation environment. The Input 40 module is used to input real world phenomenon that can be analog and/or digital in nature. Examples of analog phenomenon include temperature, speed and pressure. Generally, analog input modules are current and voltage sensing devices, and for voltage sensing, both unipolar and bipolar are commonly available. Analog phenomenon can be converted to a digital representation through analog-to-digital circuitry, for example. Digital phenomenon can be further processed (e.g., filtered, reduction in resolution, etc.), if needed. Digital phenomenon can originate from switches, sensors, etc. Moreover, digital data can be generated (e.g., in connection with emulation, derivation, inference, and/or synthesis). Digital data is typically represented as strings of binary numbers 1's and 0's demarcated into bits, bytes and words, and formatted in binary, octal and hexadecimal units. It is to be appreciated the subject invention contemplates multiple bit state representations with respect to digital data, and thus other than binary representations of digital information may be employed in connection with the subject invention.

The CPU 30 saves data from the Input 40 to memory 70 where it can be analyzed and operated on, for example to generate a control signal transmitted via the Output 50. The CPU 30 directs the control signal through channel(s) of the Output 50. An on board power supply 60 can be employed to convert and distribute power from an external power supply 80 to the other components (e.g., solid-state devices). Examples of external power sources include conventional wall power (e.g., 120/220 VAC, 60/50 Hz), regulated AC/DC through the backplane and other power storage devices. The on board backup battery 90 can be used to sustain the suspend operation long enough so that the content of the volatile memory can be saved to non-volatile memory. The memory 70 is used to store application code, instructions, data, addresses, user programs, variables, data tags and tables.

In an aspect of the present invention, the memory 70 can contain volatile and non-volatile memory. Examples of volatile memory include synchronous dynamic RAM (SDRAM), dynamic RAM (DRAM), fast page RAM (FPRAM) and extended data-out RAM (EDORAM). Volatile RAM is commonly used for run time applications and user programs. For controllers, the user written, application specific code is loaded into RAM upon launching an application. Once an application ends, it is removed from RAM. Non-volatile memory retains its contents without power. Examples of non-volatile memory include flash memory, hard disk, programmable read only memory (PROM) and ROM. Flash and hard disk memory are read/write; That is, they can be written to and read from multiple times. PROM memory exists in write once form. Once the write is performed, then the memory can only be read. Two variations of PROM are erasable programmable ROM (EPROM), which can be erased with the aid of UV light before programming, and electrically erasable programmable ROM (EEPROM), which can be electrically written over. ROM is typically strictly read only. For controllers, ROM is commonly the area where the basic input/out system (BIOS) and OS are located.

Figure 2:
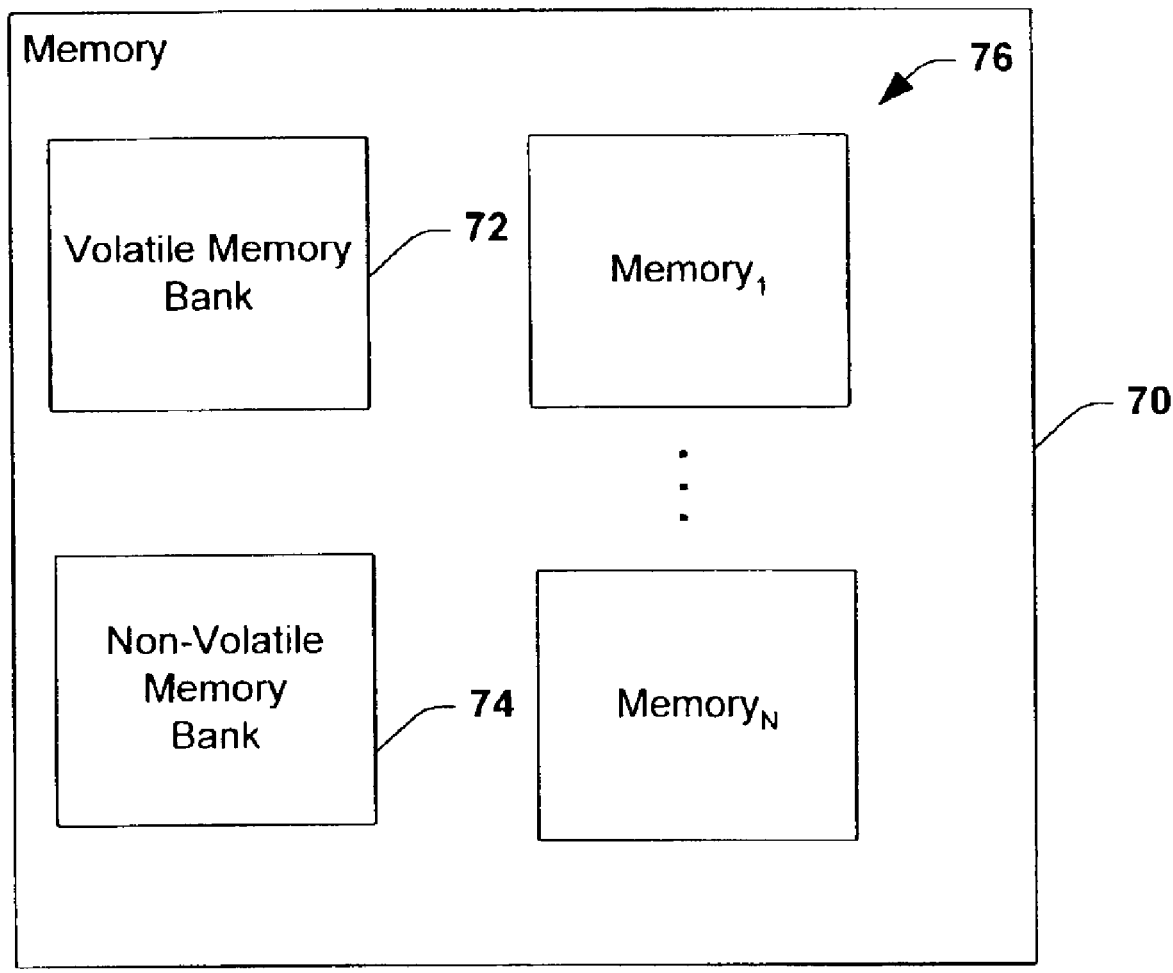
FIG. 2 is schematic block diagram of an industrial controller memory model containing volatile and non-volatile memory in accordance with an aspect of the present invention.

FIG. 2 illustrates a memory 70 architecture of an industrial control system in accordance with an aspect of the current invention. Components that are like components in previous figures are titled and referenced with the same identifiers, and therefore redundant descriptions of such components are omitted for sake of brevity. As described supra, the memory 70 is employed to store application code, instructions, data, addresses, user programs, variables, data tags and tables. In an aspect of the present invention, it can contain at least a volatile memory bank 72 for run time applications and user programs and a non-volatile memory bank 74 for persistent storage. It can also consist of N other banks of memory (N is an integer) 76 denoted as $MEMORY_1$–$MEMORY_N$ as determined by the needs of the application. The other memory banks can be volatile and non-volatile.

Figure 3:
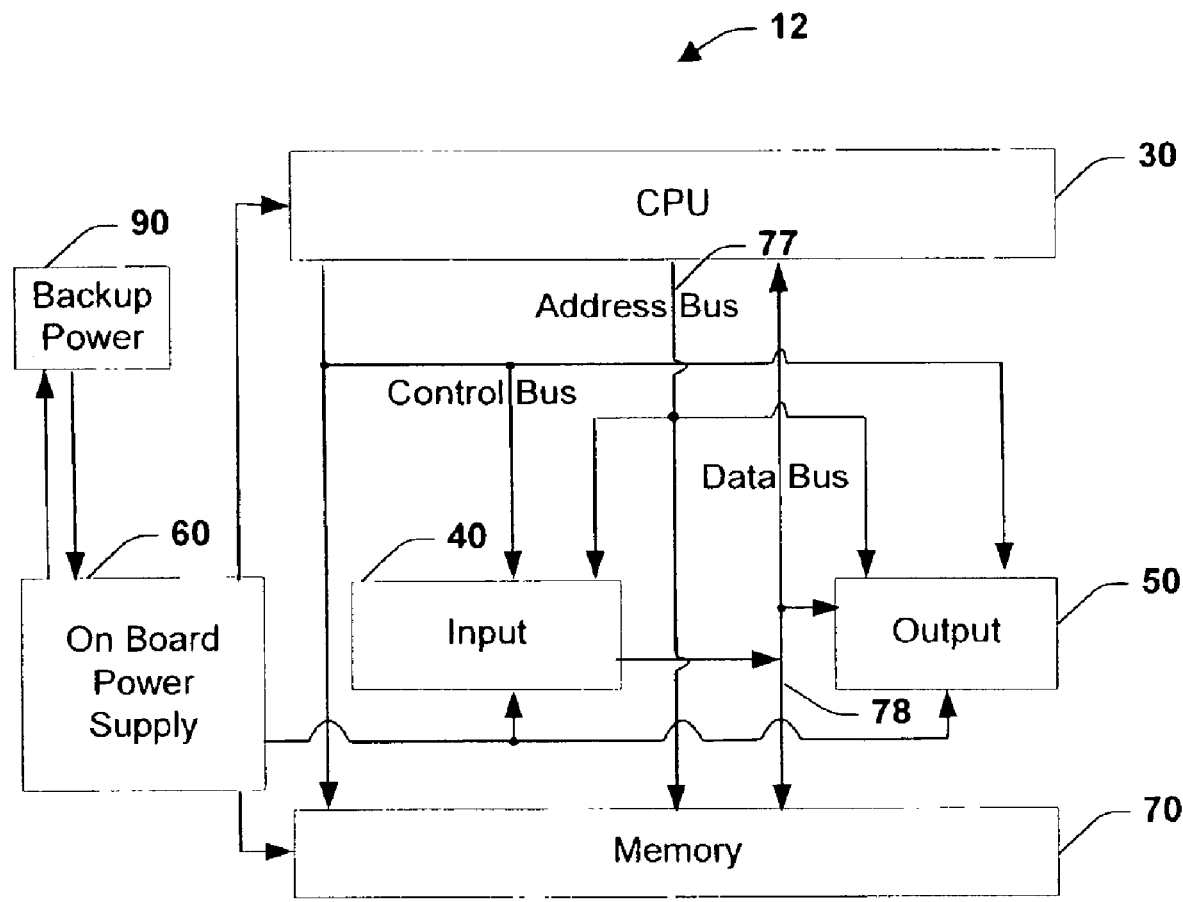
FIG. 3 is schematic block diagram of an exemplary data, address and control bus for an industrial controller in accordance with an aspect of the present invention.

FIG. 3 illustrates an internal controller communication and control architecture 12 that can be used in accordance with an aspect of the present invention. A unidirectional line from the CPU 30 to the Input 40 and Output 50 modules and the memory 70 indicates control direction. Control can, for example, define read and write cycles for the I/O, read and write data and addresses to the memory, execute instruction and operate on data. The CPU 30 controls an address bus 77, which is employed to convey address information between components. A data bus 78 conveys data bi-directionally between the CPU 30 and memory 70, and uni-directionally between the I/O and the CPU 30 and the memory 70. The CPU 30 and memory 70 can read data directly from the Input 40 and write data directly to the Output 50 via the data bus. The CPU 30 can use the address bus 77 to store and retrieve data from the memory 70 at specific locations and to read from and write to the I/O 40, 50. The CPU 30 can also provide the memory 70 with an I/O address for direct reads and writes to the IO. The on board power supply 60 energizes each component and charges the backup power 90. Backup power 90 can be used to temporarily maintain components with energy if the external power supply (not shown) fails to provide the on board power supply 60 with adequate power. The control process can come to a halt or become unpredictable if any of the components looses its power.

Figure 4:
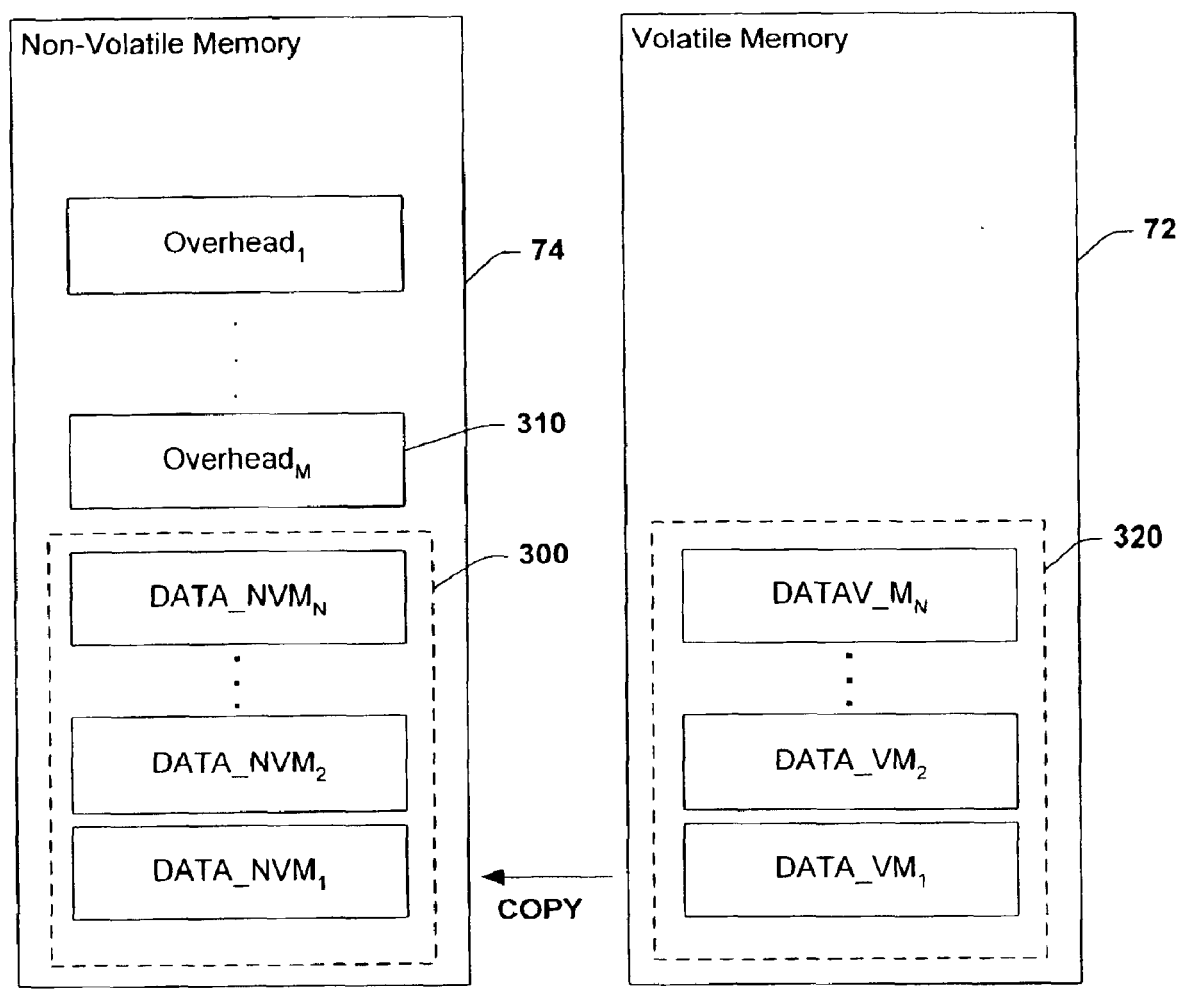
FIG. 4 is schematic block diagram showing an exemplary image copy routine from volatile memory to non-volatile memory in an industrial controller memory model in accordance with an aspect of the present invention.

FIG. 4 illustrates a memory image transfer scheme 14 that can be employed, in accordance with an aspect of the present invention, to save an image of the volatile memory 72 to the non-volatile memory 74—such image is used in connection with saving state and context information of the controller prior to complete shutdown. Content 320 (e.g., Data__$VM_1$–Data__$VM_N$) of the volatile memory 72 is saved as an image. During a write from volatile memory to non-volatile memory, the content 320 written to the non-volatile memory is an exact copy or image. The image content 300 (which is a replica of the contents 320) is saved in the non-volatile memory (e.g., flash memory) 74. The non-volatile memory can store additional information (e.g., overhead 310 data). The overhead data 310, for example, can include validating code, image addresses, etc.

Figure 5:
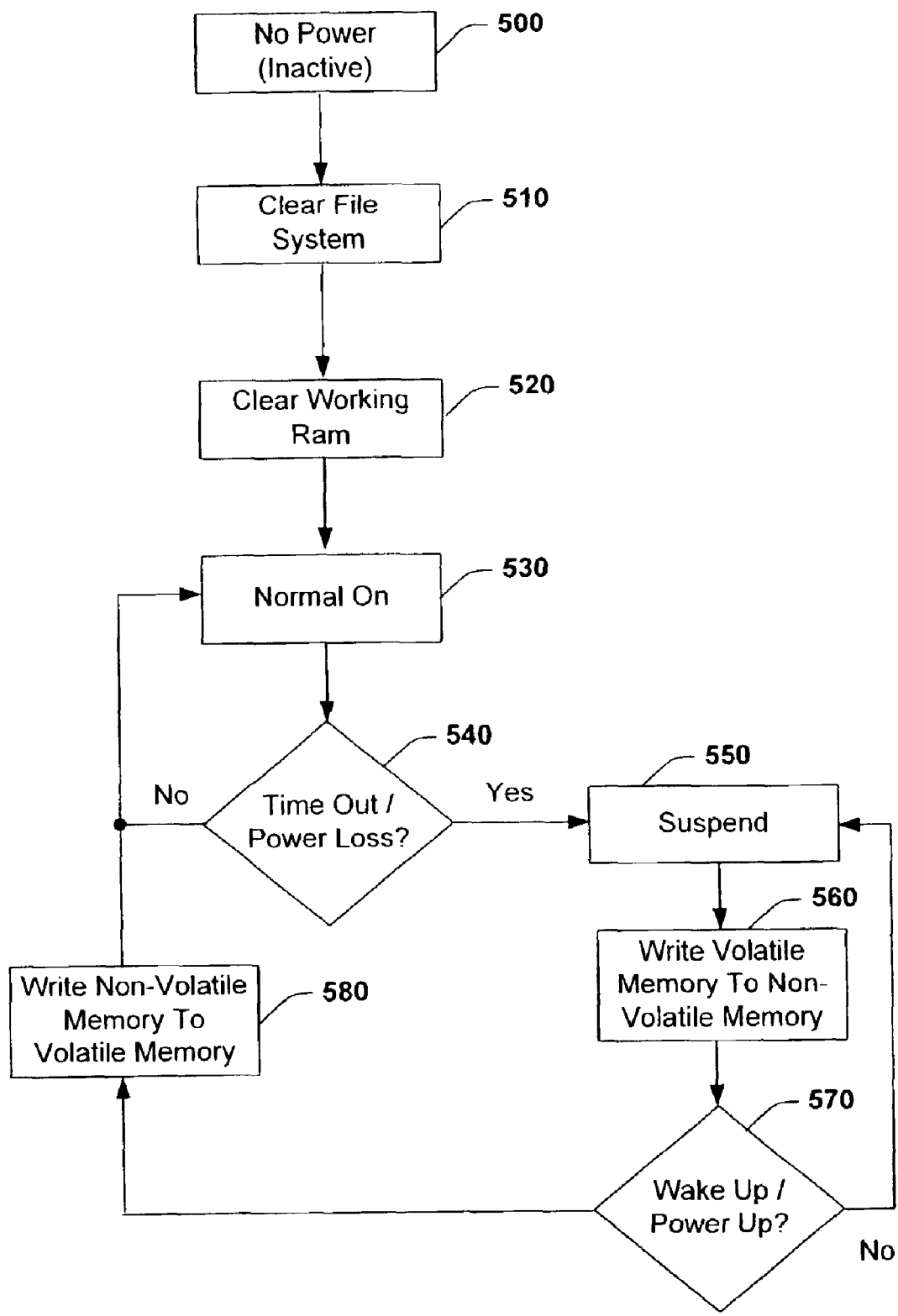
FIG. 5 is a flow diagram of exemplary power management architecture in accordance with an aspect of the present invention.

FIG. 5 shows a block diagram that illustrates an exemplary power management architecture with hibernate functionality in accordance with an aspect of the present invention. The diagram begins in an inactive state at 500. After applying power to the system, an initialization process commences that typically includes clearing the file system at 510 and the working volatile memory at 520. After initialization is complete, the system enters a normal operating mode at 530. The system senses the primary power supply at 540. If a primary power loss is detected, the platform enters suspend mode at 550, and the volatile memory can be saved to non-volatile memory at 560. The system remains in suspend until a wake up event occurs. On a wake-up event at 570, the volatile memory can be returned to the state prior to suspend by copying the non-volatile memory to the volatile memory at 580. The operating system can then return to the normal operating state at 530.

Figure 6:
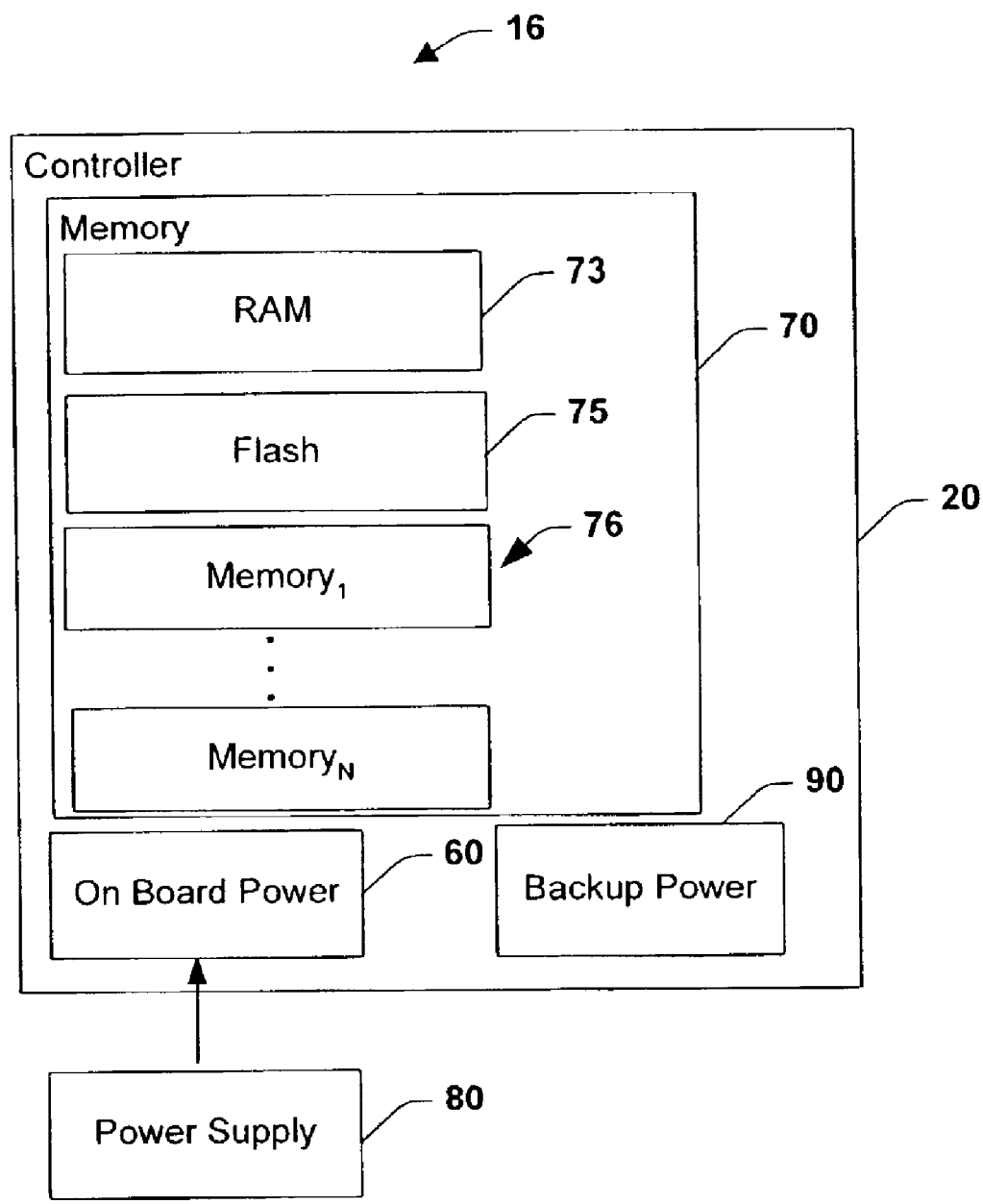
FIG. 6 is schematic block diagram of an exemplary industrial controller with RAM and flash memory banks in the memory model in accordance with an aspect of the present invention.

An aspect of the present invention is illustrated in FIG. 6, which shows a system 16 where the controller memory 70 has at least one bank of volatile memory (RAM 73) and one bank of non-volatile memory (Flash 75). In one embodiment, the open operating system of the industrial controller supports hibernate functionality as described supra. Again, for this type of system power to the controller 20 is not completely removed when the user suspends the operation and powers down through the process of enabling an operating system controlled suspend and power down. Instead, the operating system places the controller 20 in a suspend, sleep or low power mode, for example, where limited power is supplied to the controller components so that power consumption is at a minimum but the system can be brought back to the state prior to suspend.

For this embodiment, the suspend process is interrupted and the content of the RAM 73 is saved to the flash memory 75. Then the CPU executes instructions to place the system is a suspend state where power is removed from RAM and other components in order to conserve secondary power. Upon resume, the image written to the flash memory 75 can be copied to the RAM 73. The RAM 73 can then be validated to ensure that it is not corrupted. If it is not corrupted, then the controller 20 will be in the same state as it was prior to suspend. If it is corrupted, then the RAM 73 is cleared and the controller 20 resets.

Figure 7:
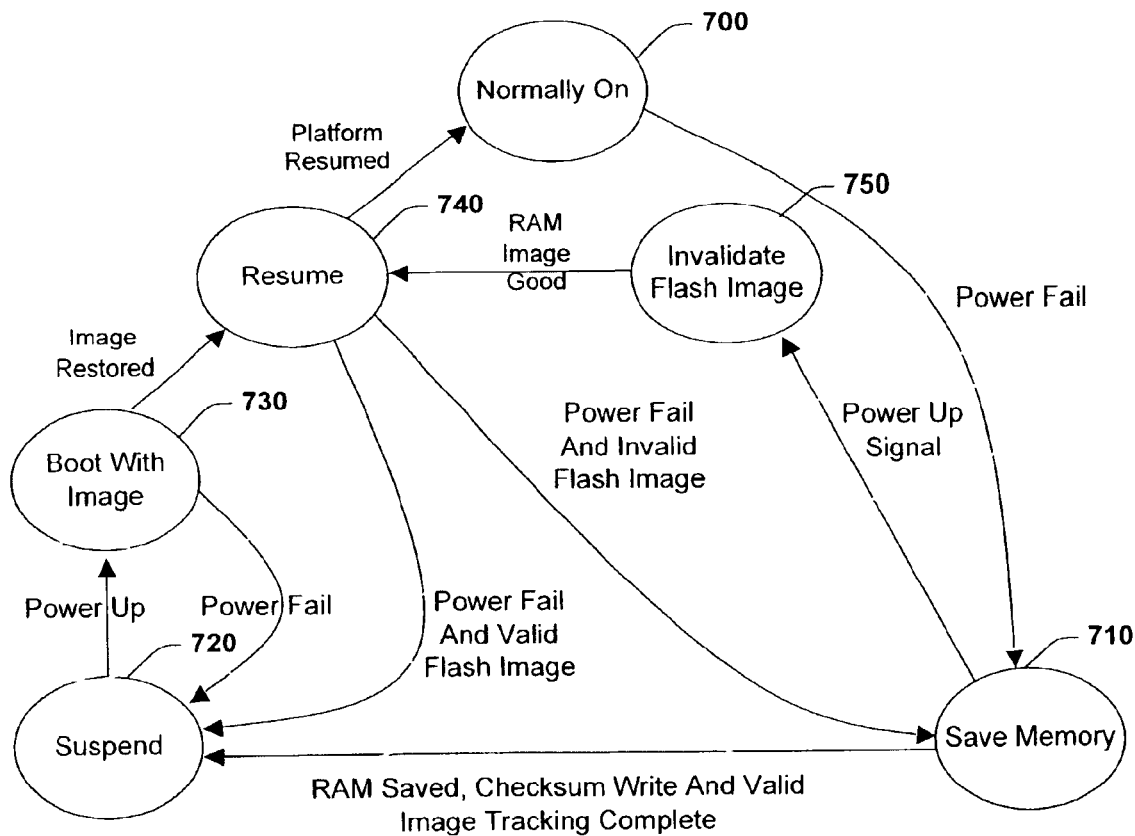
FIG. 7 is a state diagram of saving and restoring controller state and context in accordance with an aspect of the present invention.

FIG. 7 illustrates an exemplary state diagram in accordance with an aspect of the present invention. Commencing in a normally on state at 700, if the system detects that power has been removed, then the system enters the save RAM to flash memory at 710. If system power were returned before entering the suspend state, then the RAM content would still be valid, and the image in flash memory would be invalidated 750 and the system would resume and re-enter the normal operating state 700. If power is not returned, then the content of RAM is written to flash memory. The copy of the RAM in flash memory can then be validated to ensure an uncorrupt copy has been saved. After determining that a valid copy of the RAM exists, the system enters the suspend state at 720. Upon detecting a power on signal, the system enters a boot state at 730 where the RAM content is restored with the copy that was saved in flash memory. Once the system leaves the boot state at 730, it enters a resume state at 740 where substantially all drivers and application are resumed, and then the system re-enters the normal operating state at 700.

Power losses during restoring the image were not addressed in the above explanation and will be addressed here. Beginning in the boot state at 730, if a power loss is detected before leaving 730, then the system returns to the suspend state at 720. If a power loss is detected before leaving the resume state at 740, then the system either returns to the suspend state at 720 or to the save RAM image to flash memory state at 710. The factor determining the transition is the validity of the RAM image stored in flash memory. If the image is valid, then the next state is the suspend state at 720 and if the image is corrupt, then the next state is the save RAM image to flash memory state at 710.

In another embodiment, the operating system does not support hibernate functionality (e.g., Windows-NT). In this type of operating system, power to the controller 20 is removed when the user powers down through enabling an operating system controlled power down. For this embodiment, when the user powers the controller down through the process of enabling an operating system controlled power down, for example, the content of the RAM 73 is written to the flash memory 75 before the CPU (not shown) executes instructions to end applications, clear registers and remove power to the controller. Once power is removed from the controller, power to persist the RAM 73 no longer exists and any information residing in the RAM 73 can be cleared. When the user powers the system up, the CPU executes instructions to write the content of flash memory 75 to RAM 73. The RAM 73 is validated through a method like a checksum to ensure that it is not corrupted. If it is not corrupted, then the controller 20 will be in the same state as it was prior to power down. If it is corrupted, then the Ram 73 is cleared and the controller 20 will be in an initial state.

Figure 8:
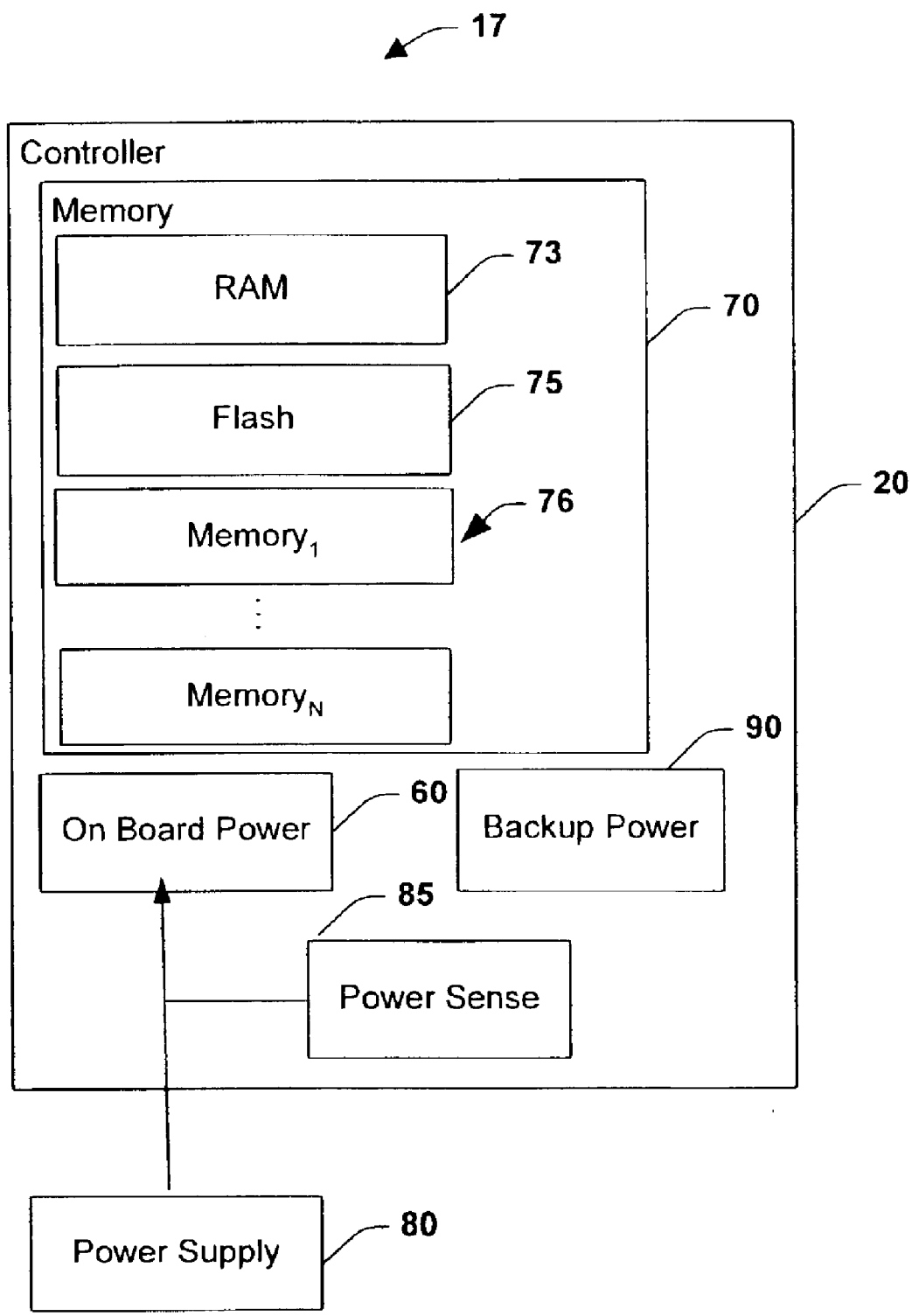
FIG. 8 is schematic block diagram of an exemplary industrial controller with power sense circuitry to facilitate the transfer of the image of RAM to flash memory in accordance with an aspect of the present invention.

It can be appreciated that the ability to save controller context and state is not only important for the above situations but under any circumstance that removes power such as a power loss. This embodiment is illustrated in the system 17 of FIG. 8, which further includes an internal power sensing circuit 85. It can be appreciated that the power sensing circuit can be internal or external to the controller, depending on the application. The power sensing circuit 85 can be employed to determine if power is present from the external power supply. It can be appreciated that the same circuitry can also be used to sense backup power availability and power to at least one of a plurality of components that populate the controller. This could be used in troubleshooting power faults and ensuring acceptable backup power. It can be appreciated that the power sensing circuit can be any current and voltage sensing circuitry known in the art. The power sensing circuitry can provide feedback that will alarm the controller that power has been lost and trigger the backup battery to temporarily provide energy for a RAM dump to flash memory. The algorithm can be any algorithm that is known the art to provide such functionality.

Figure 9:
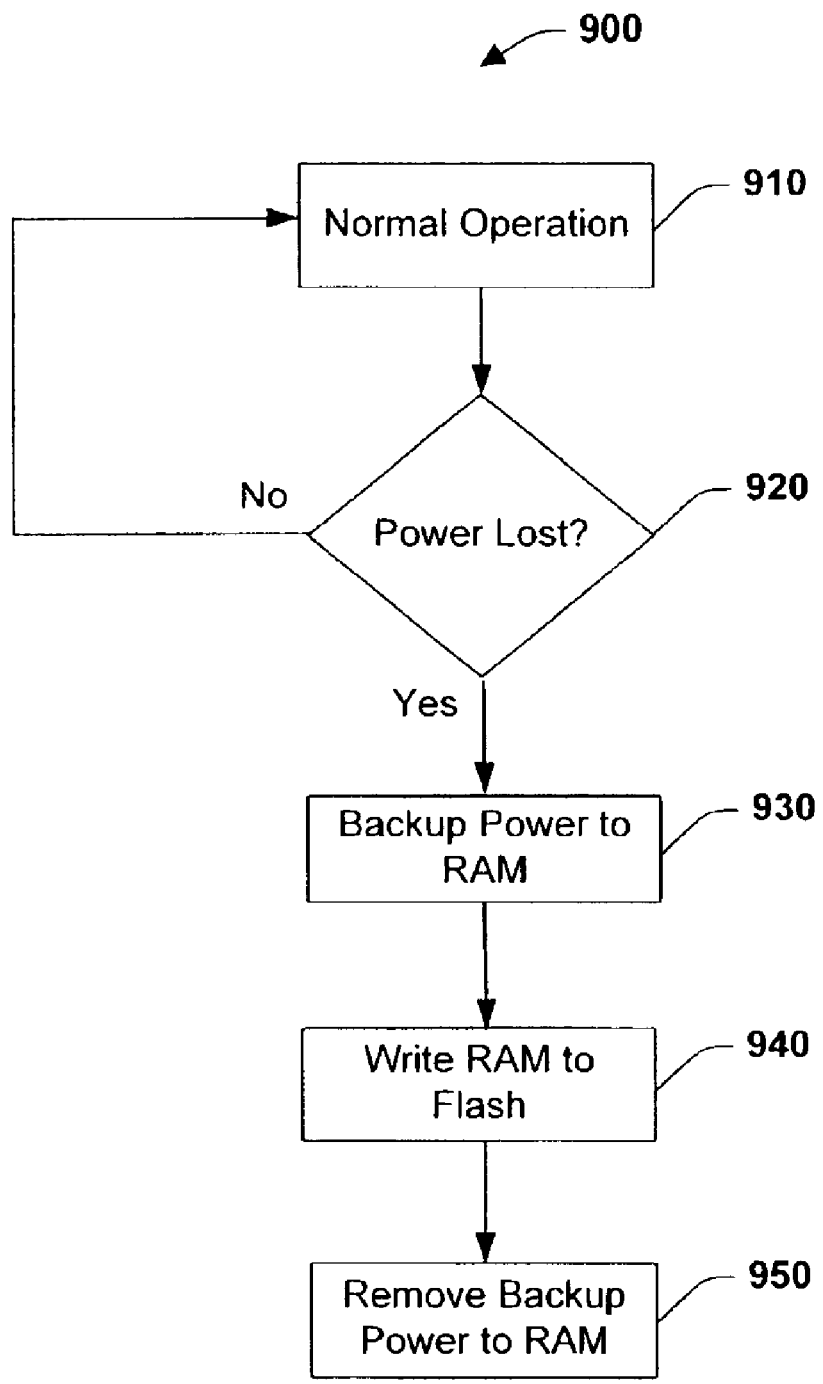
FIG. 9 is a flow diagram illustrating a method to write an image of the RAM to the flash memory when power loss is sensed in an industrial controller in accordance with an aspect of the present invention.

FIG. 9 shows a flow diagram that illustrates a methodology 900 for saving the state and context of a controller from RAM to flash memory prior to removing power from RAM. The power removal can be from an operating system enabled shut down where power is removed from all components and an unexpected loss of the power supply. For purposes of simplicity, the methodologies are shown and described as a series of blocks. It is appreciated that the present invention is not limited by the sequence or function of the blocks, as some blocks may, in accordance with the present invention, occur in different order and/or concurrently with other blocks from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Methodology 900 commences with the operating system at 910 in normal operation. Normal operation could mean that the controller booted up properly and passed the initialization procedure, which may, as an example, include error checking. Furthermore, application code could be running or in a transition state. While the controller is in normal operation, the on board power is sensed at 920 to ensure that there is enough power to maintain the controller. As long as there is enough power to maintain the controller, then the system remains in normal operation at 920. The sensing mechanism could be hardware like current or voltage level sensing through a comparator and a normally open or closed loop with relays, or it could be in software where an incorrect voltage level elicits an error handler to be thrown. If it is determined that power is lost at 920 so that the power will not maintain the controller, then the ancillary backup power will be enabled at 930 to provide enough power to sustain the RAM and allow the RAM to be written to flash memory. It can be appreciated that the ancillary power could be from any combination of an internal and external backup power, depending on the application. The content of the RAM is then saved to flash memory at 940. The write could be checked through a checksum or data compare. After the RAM has been written to flash memory, then the ancillary backup power can be removed 950 from the RAM, allowing the content of the RAM to be cleared.

Figure 10:
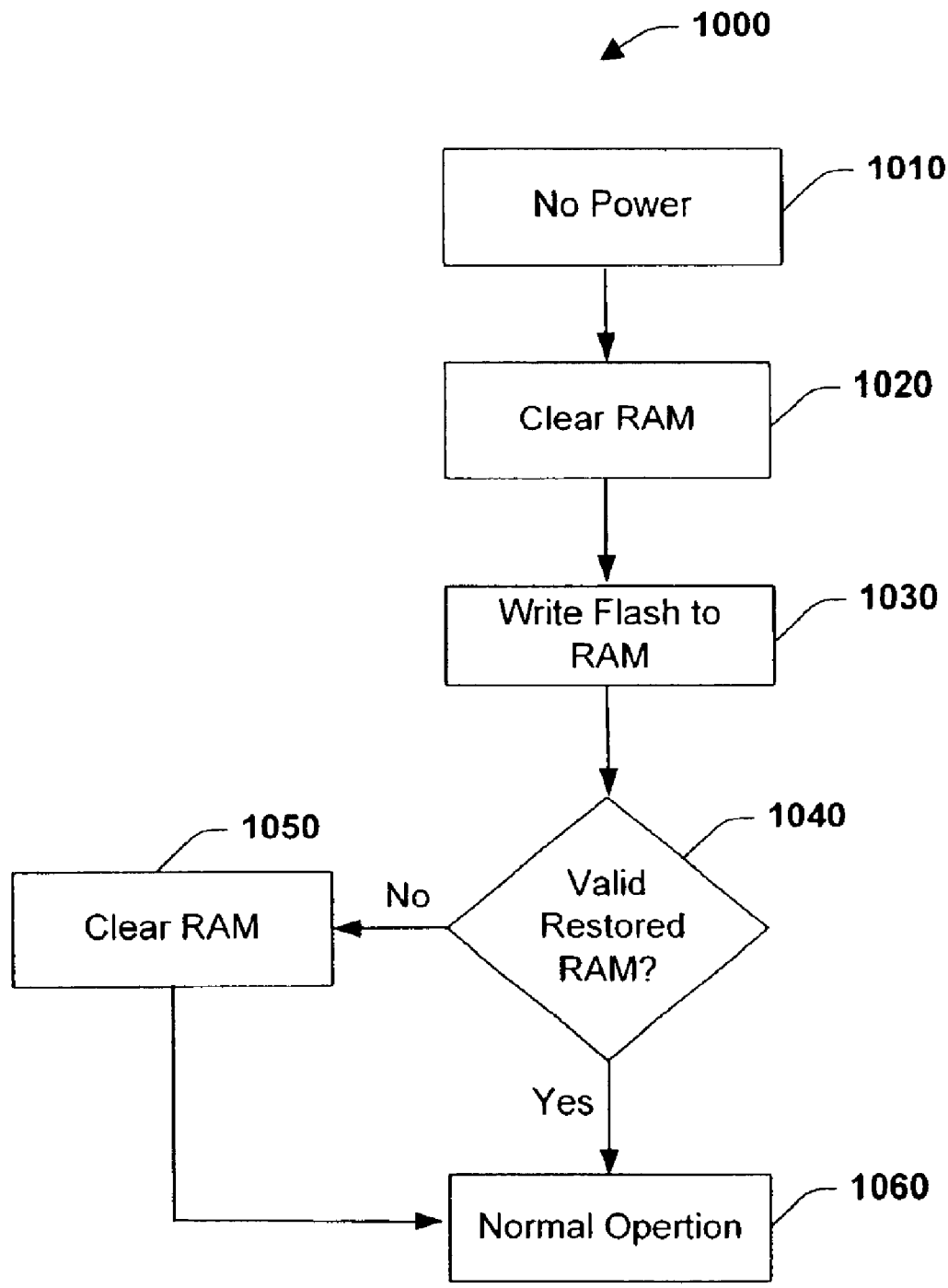
FIG. 10 is a flow diagram illustrating a method to restore controller state and context upon booting up an industrial controller in accordance with an aspect of the present invention.

FIG. 10 shows a flow diagram that illustrates a methodology 1000 for restoring the state and context of the controller upon powering up. Methodology 1000 commences at 1010 in the off state. Upon applying power and turning on the system, the initialization process proceeds at 1020. The system undergoes a normal boot sequence, which includes clearing the RAM. The RAM is then restored with the image from flash memory at 1030. The write is validated at 1040 to ensure that the RAM is not corrupted. If the RAM is uncorrupted, the operating system will complete the boot process, and the system will proceed to a normal operation state at 1060. Using the image in flash memory affords for the state and context of the controller to be safely returned with the integrity thereof prior to the power loss, regardless of how the power loss occurred. If the RAM is corrupted, the operating system will clear the RAM at 1050 again. Since the RAM image in flash memory is corrupted it will not be used, and the controller will proceed to 1060 for normal operation, however the context and state will be a default state and context.

Figure 11:
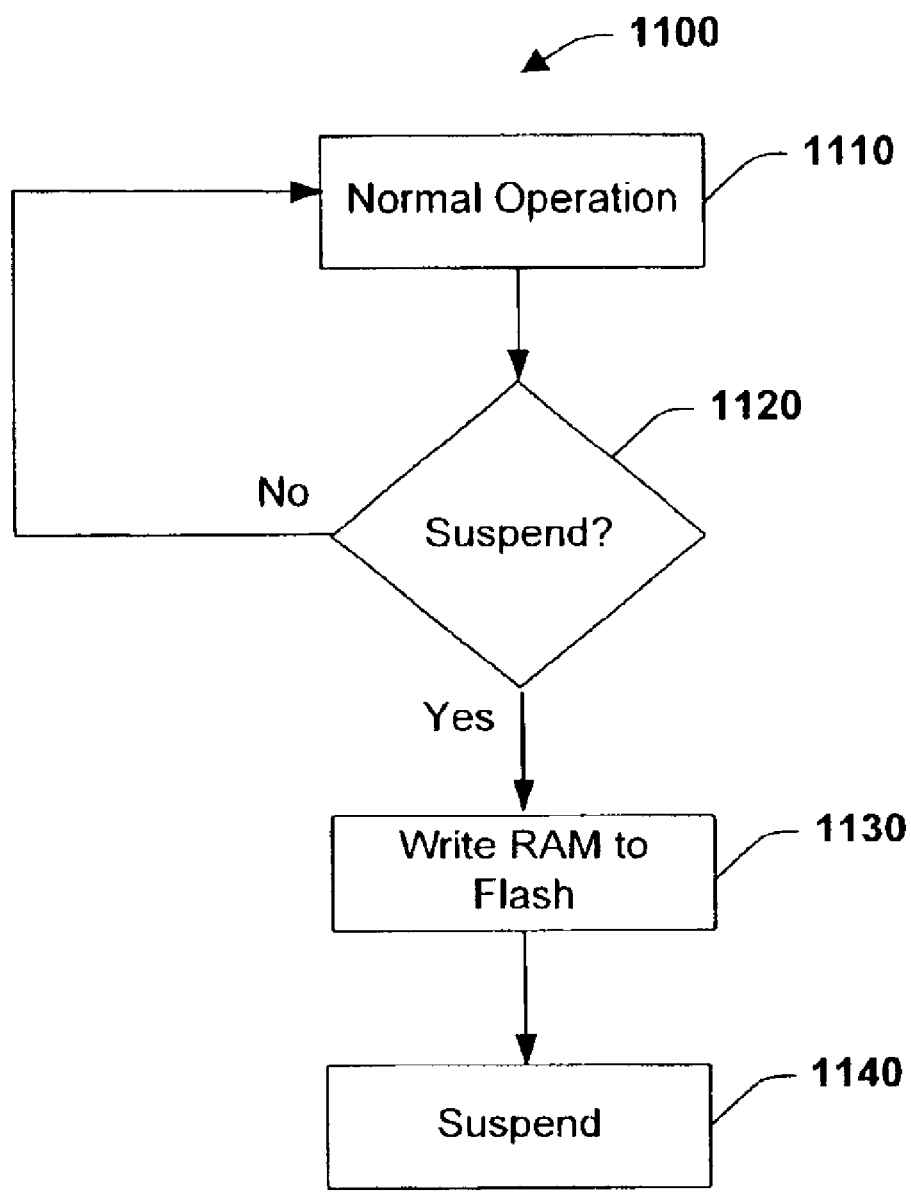
FIG. 11 is a flow diagram illustrating a method to save controller state and context during a suspend in an industrial controller in accordance with an aspect of the present invention.

FIG. 11 illustrates a methodology 1100 for saving state and context of the controller during a suspend operation. Methodology 1100 commences at 1110 in a normal operating state. After detecting a suspend event at 1120, the system is interrupted from proceeding with placing the system in a suspend state. The content of RAM can then be written to flash memory at 1130. This allows the current state and context to be saved in non-volatile memory. The content of flash memory could be validated to ensure that it contains a valid image of the RAM. The operating system can then place the system in suspend at 1140.

Figure 12:
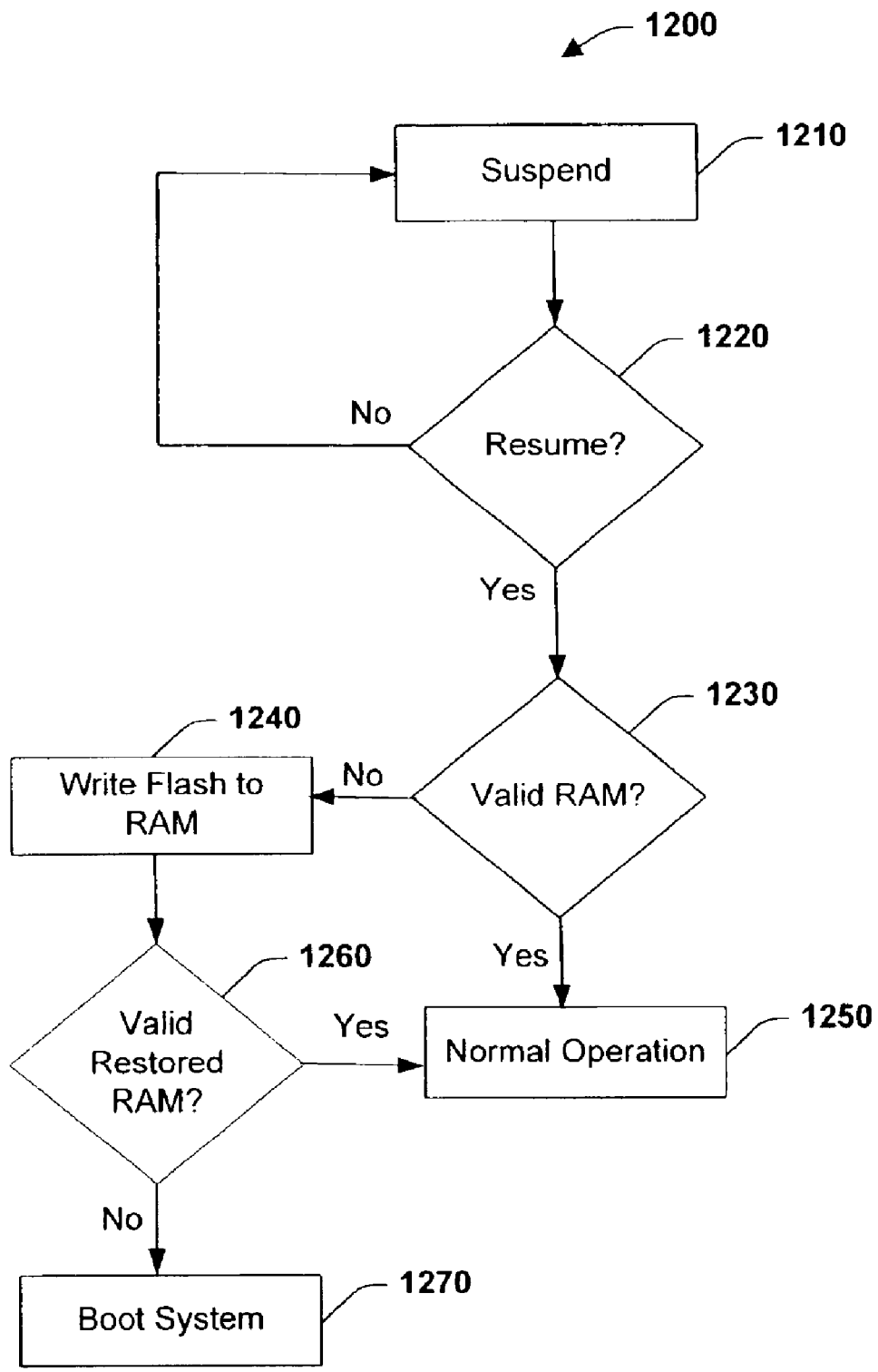
FIG. 12 is a flow diagram illustrating a method to restore controller state and context during a resume in an industrial controller in accordance with an aspect of the present invention.

FIG. 12 shows a flow diagram that illustrates a methodology 1200 for restoring the state and context of the controller during a resume. Methodology 1200 commences in a suspend at 1210. After a resume event is detected at 1220, the operating system is interrupted from proceeding with placing the system back in a normal operating state. The RAM is validated at 1230 to ensure that it isn't corrupted. If the RAM is valid, then the image saved in flash memory is not needed, and the operating system proceeds to a normal operating state at 1250. If it is determined that the RAM is invalid, then the RAM is restored with the content of flash memory at 1240. The RAM is validated at 1260. If the RAM is valid, then the operating system proceeds to a normal operation state at 1250. If the RAM is corrupt, then the operating system resets or reboots itself at 1270. A reboot will initiate methodology 1000 of Fig. 10.

Figure 13:
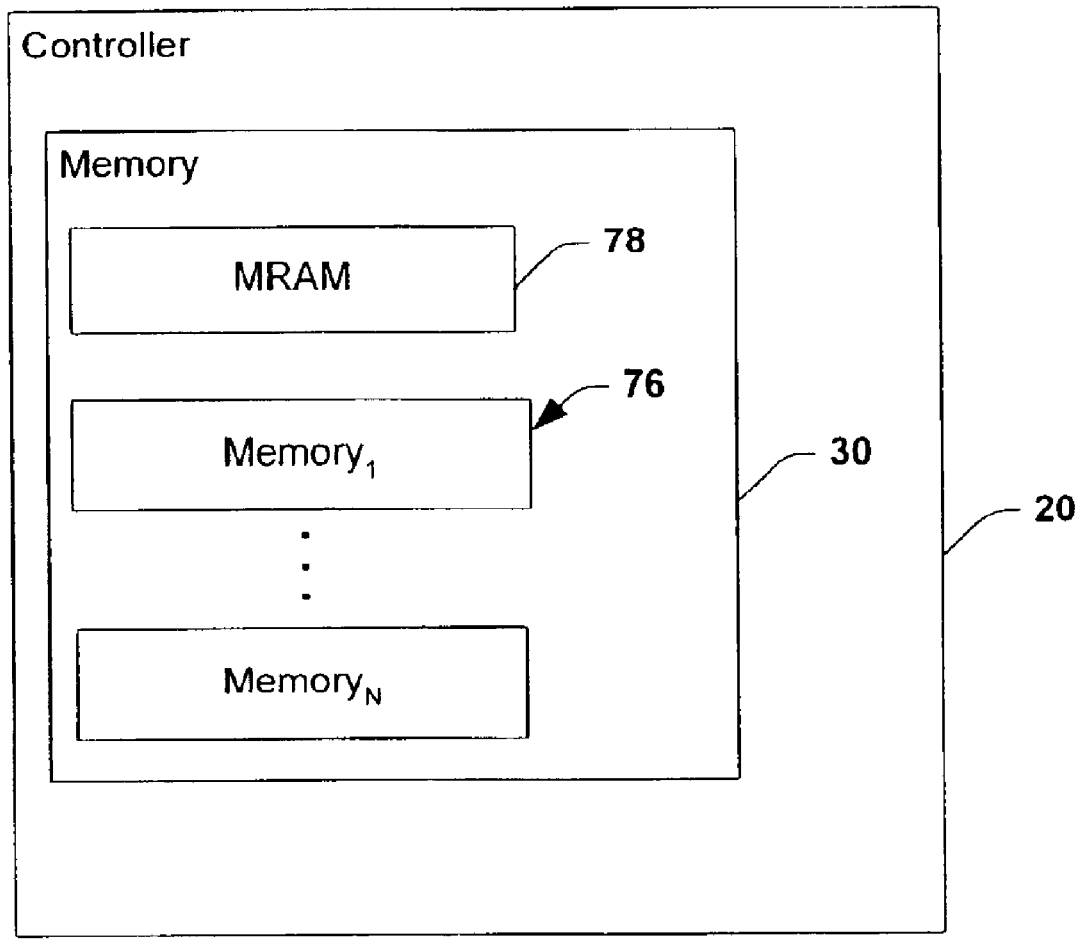
FIG. 13 is schematic block diagram of an industrial controller memory model containing MRAM in accordance with an aspect of the present invention.

FIG. 13 illustrates a system 18 where the controller 20 memory 30 at least contains magnetic RAM (MRAM) 78. MRAM memories are often constructed like integrated DRAM memories. Generally, these memories comprise a cell arrangement with substantially parallel row lines and column lines, whereas the row lines customarily run transverse to the column lines. Typically, each of the memory cells is wired between one of the row lines and one of the column lines and electrically connected to the respective column line and row line. The memory cells with a magnetoresistive effect are thus more highly resistive than the row lines and column lines. The column lines are connected to a read amplifier for reading a data signal of one of the memory cells. Reading is accomplished by measuring the detectable current on the column line. In an MRAM memory of that type, there are no diodes or transistors such as are provided in a DRAM memory for connecting the memory cells to the respective column lines in dependence upon the addressing for reading purposes. This brings particular advantages given a geometric arrangement of the memory cells. In particular, it is possible to save space in the arrangement of the memory cells by using a stack arrangement of the cells. An advantage of MRAM compared to traditional semiconductor memory devices such as DRAM is that MRAM can be made smaller and provide a non-volatile memory. For example, a controller utilizing MRAM would not have a long "boot-up" time as with conventional controllers that utilize DRAM. MRAM permits the ability to have a memory with more memory bits on the chip than DRAM or flash memories. Also, an MRAM does not need to be powered up and has the capability of "remembering" the stored data.

Since MRAM 78 does not require a power supply to sustain its contents, the state and context of the controller will be preserved regardless of whether power is available to the controller. As indicated in FIG. 13, memory 70 can include memory of at least MRAM. Other types of memory may also be employed where expense, space, speed and other factors determine it makes more sense.

Figure 14:
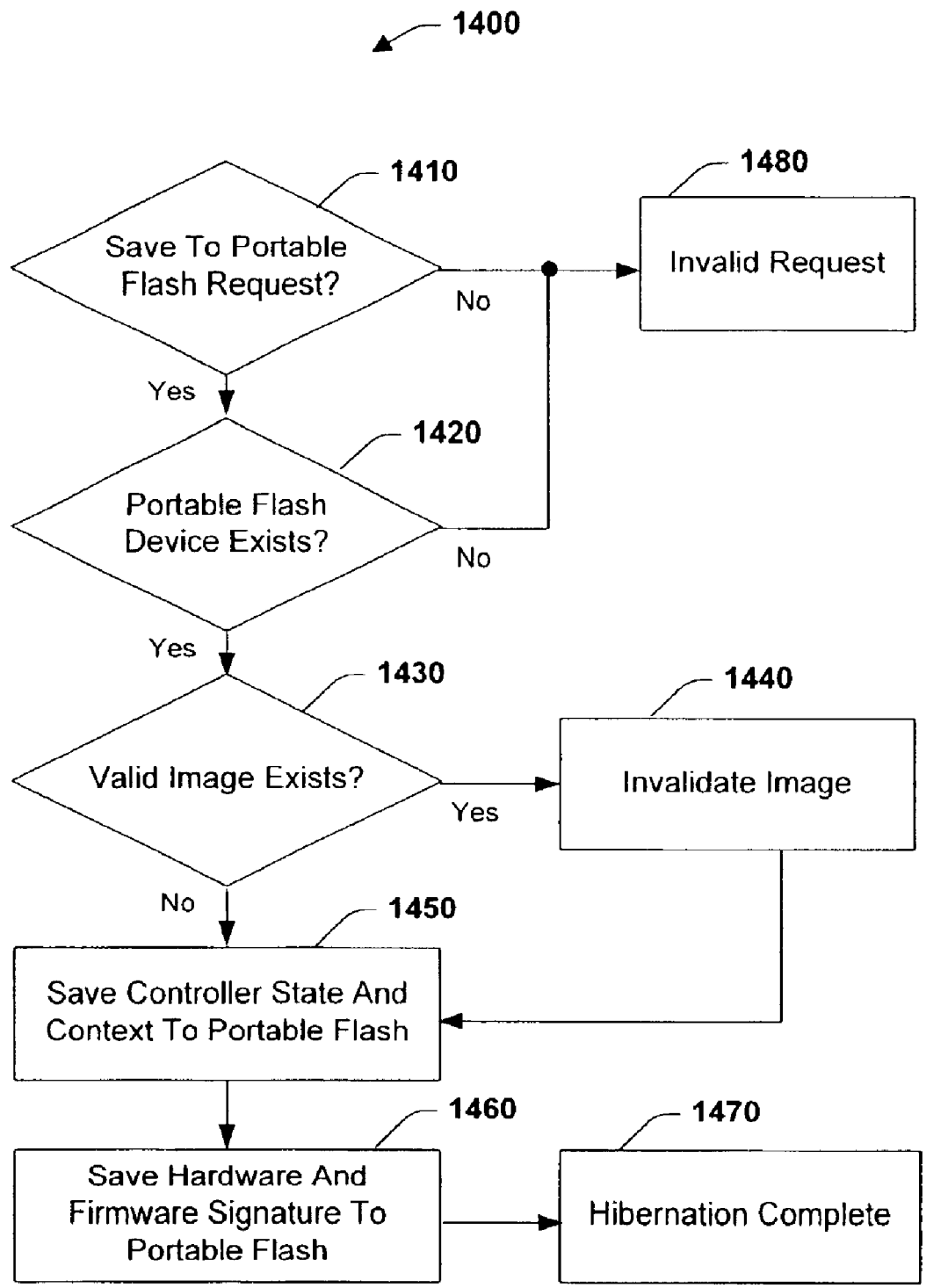
FIG. 14 is a flow diagram illustrating a methodology for saving the controller state and context in portable flash memory in accordance with an aspect of the present invention.

FIG. 14 illustrates a methodology 1400 for saving the portable state and context image. The flow diagram begins at 1410. If it is determined that a portable image is desired, a check to make sure that a portable non-volatile medium such as flash memory occurs at 1420. After verifying the presence of memory, the content of the memory is interrogated for a previous image at 1430. If an image exists, it is invalidated at 1440. The state and context of the controller are then saved to flash memory at 1450. This is followed by the hardware and firmware signatures being saved to flash memory at 1460. If it is determined that a request to save a portable image at 1410 or that portable flash is not present at 1420, then an error is returned and the controller continues its normal operation at 1480.

Figure 15:
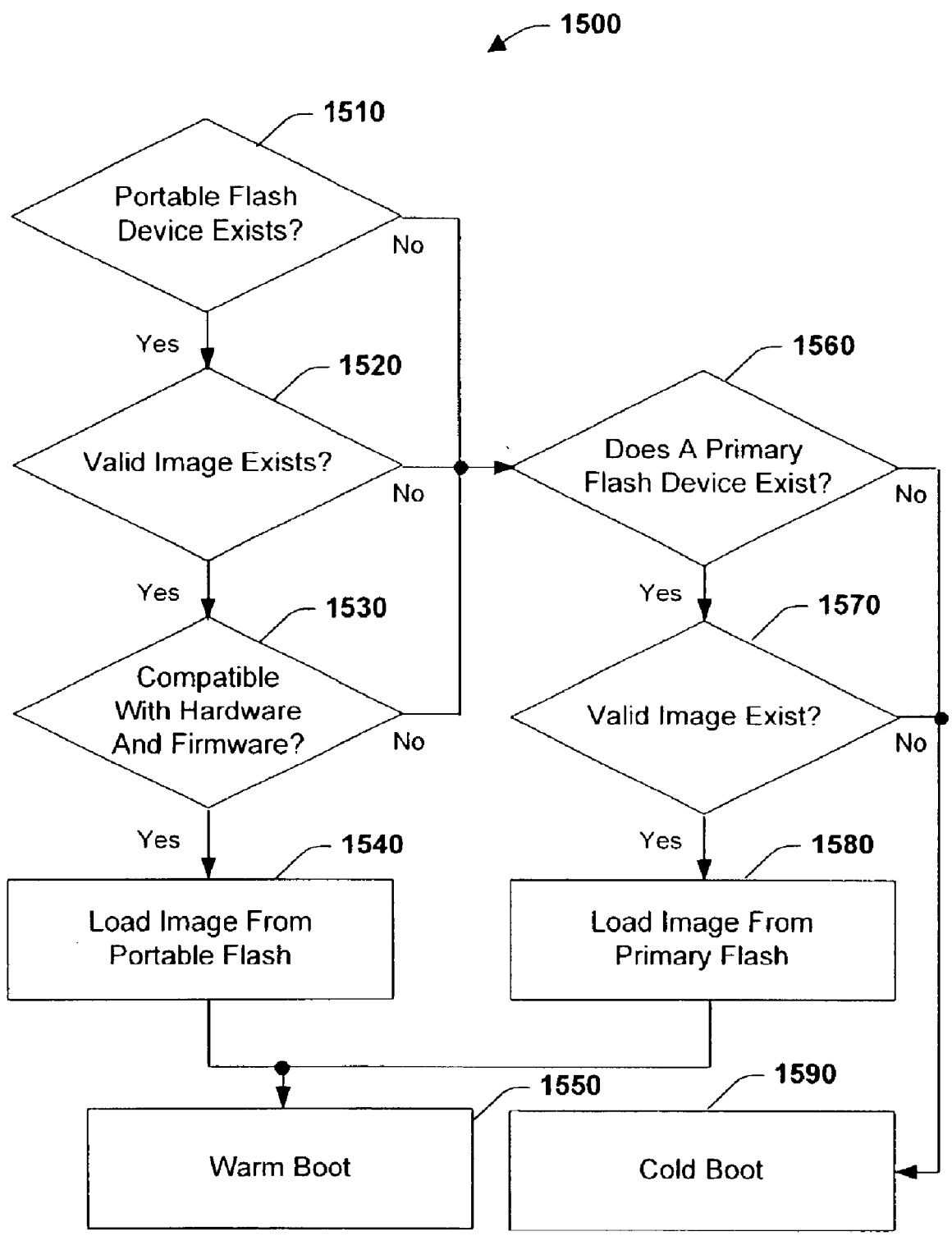
FIG. 15 is a flow diagram illustrating a methodology for powering up an industrial controller with a state and context stored in flash memory in accordance with an aspect of the present invention.

FIG. 15 illustrates a methodology 1500 for powering up an industrial controller that employs an open operating system with a portable image of a controller's state and context. The flow diagram begins at 1510 where it is determined if a portable flash memory device exists. If portable memory exists, then the image in the memory is validated at 1520 and checked for compatibility at 1530. Upon confirming an acceptable image, the image is loaded from the portable memory device to the controller at 1540. The controller then proceeds with a warm system boot at 1550. If it is ascertained that a portable device does not exist at 1510, the image is corrupt at 1520 or the image is not compatible at 1530, then it is determined if primary flash device exists at 1560. If a primary flash device is not found at 1560 or if one is found but the state and context image is corrupt at 1570, then the controller proceeds with a cold boot 1590. Otherwise, the image on the primary device is validated at 1570 and loaded at 1580, and the controller proceeds with a warm system boot at 1550.

In yet another embodiment of the present invention, a methodology is utilized for hibernating the state and context of an industrial controller employing an open operating system without the use of a secondary power source. For this embodiment, an on-demand state and context save mechanism (e.g., a switch on the platform or a command through the programming station) is utilized. This mechanism would be used to save a state and context of the controller into a non-volatile flash memory. The state and context could then serve as a restart image for the same controllers on every subsequent power-up. Several advantages of employing this methodology are reduced cost, faster shutdown time and less complexity. In addition, a machine can be commissioned with a known and repeatable controller start-up state that can be stored in hardware and does not deteriorate with time.

Figure 16:
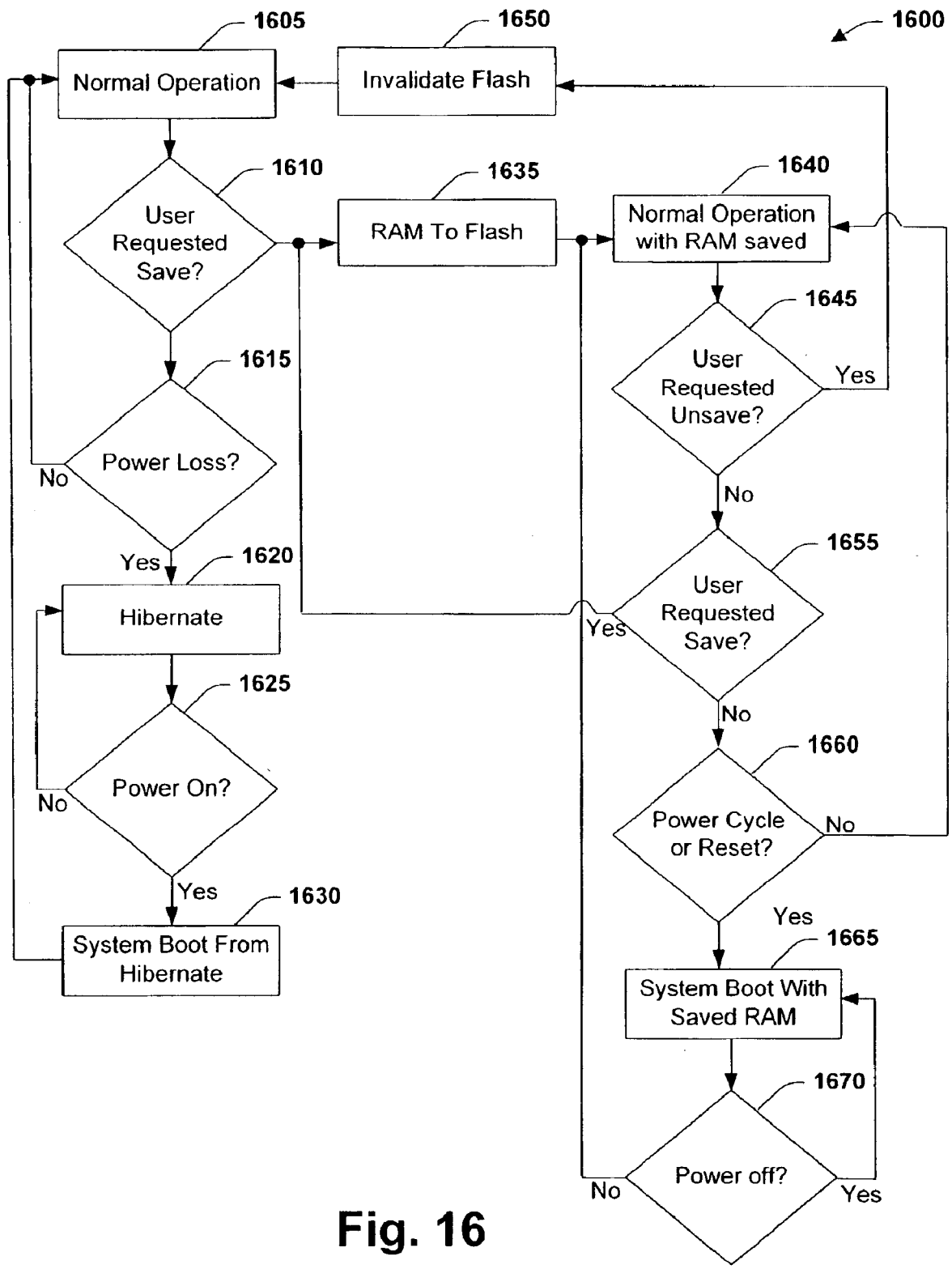
FIG. 16 is a flow diagram illustrating a methodology relating to initiation of an image in accordance with one particular aspect of the subject invention.

FIG. 16 illustrates a methodology 1600 for saving the state and context of an industrial controller employing an open operating system without the use of a secondary power source. The methodology begins in normal operation at 1605. If a user initiated save is not detected at 1610 and power is not lost at 1615, then normal operation at 1605 is maintained. If a user initiated save is not detected at 1610 and a power off is detected at 1615, then hibernate mode is entered at 1620. The transition to hibernate mode can include suspending drives, saving the processor state, invalidating the hibernate image, saving the RAM to flash memory, validating the RAM copy in the flash memory and halting the CPU. Upon sensing power at 1625, a system boot is initiated at 1630. The boot can include updating the operating system, initializing hardware, writing the flash to RAM, restoring the processor state, resuming drives and resuming applications. Once the boot process is complete, then normal operation returns at 1605.

If a user initiated save is detected at 1610, then at least the content RAM is saved to flash at 1635. This save copies the state and context of the controller into flash memory. Once complete, a normal operating state with a user initiated saved controller state and context commences at 1640. If a user initiated unsave is detected at 1645, then at least the flash at 1650 is invalidated, and normal operation at 1605 returns without a valid copy of the controller state and context saved in flash memory. If a user initiated unsave is not detected at 1645, but a user initiated save is detected at 1655, then at least the RAM is saved to flash at 1635. The transition from 1635 is described supra. If a user initiated save is not detected at 1655, but a power cycle or reset is detected at 1660, then a system boot with saved RAM occurs at 1665 that can include updating the operating system, initializing hardware, writing the RAM copy saved in the flash back to the RAM, restoring the processor state, resuming drives and resuming applications. Once the boot is complete and power loss is not sensed at 1670, then normal operation with the user initiated state and context returns at 1640. If the power loss is detected at 1670, the system boots again at 1665.

In another embodiment of the present invention, a methodology is utilized for porting the state and context of an industrial controller employing an open operating system. For this embodiment an on-demand state and context save mechanism (e.g., a switch on the platform or a command through the programming station) is utilized. This mechanism would be used to save a state and context of the controller into a removable and portable non-volatile flash memory (e.g., CompactFlash). The state and context saved on the non-volatile memory could then serve as a restart image for the same or identical controllers on subsequent power-ups. Not only does this methodology provide the benefit of ghosting controller state and context, but it facilitates maintenance of controller hardware with a previously saved and running operating image of the controller.

What is claimed is:

1. A system that facilitates retention of data in an industrial controller that employs an open operating system, comprising:

a volatile memory component that stores controller state and context data;

a power monitoring component that monitors power state of the controller;

a non-volatile memory component; and a processing component that generates an image of the controller state and context data from the volatile memory upon receiving a signal from the power monitoring component that the controller is undergoing a power loss condition, and saves the image in the non-volatile memory component.

2. The system of claim 1, the non-volatile memory component being flash memory.

3. The system of claim 1, the non-volatile memory component being MRAM.

4. The system of claim 1, the power loss condition being a power failure condition.

5. The system of claim 1, the power loss condition being a power suspend condition.

6. The system of claim 1, the power loss condition being an operating system based power shutdown.

7. The system of claim 1, the processing component writing the image from the non-volatile memory back to the volatile memory upon receiving power resumption condition signal from the power monitoring component so as to restore the controller state and context information.

8. The system of claim 1 further including a supplemental power supply that facilitates providing power to the volatile memory for a duration greater than the time required to write the image to the non-volatile memory.

9. The system of claim 1 further comprising an image validation component that validates the image upon writing to the non-volatile memory and the volatile memory.

10. The system of claim 9, the image validation component providing instructions to regenerate a new image upon deeming that the present image is corrupt.

11. An industrial controller comprising the system of claim 1.

12. An industrial automation process employing the system of claim 1.

13. A system that facilitates retention of data in an industrial controller that employs an open operating system, comprising:

means for monitoring power state of the controller; and means for generating an image of controller state and context data from volatile memory of the controller upon receiving a signal from the power monitoring component that the controller is undergoing a power loss condition, and saving the image in a non-volatile memory component.

14. The system of claim 13, the non-volatile memory component being part of the controller.

15. The system of claim 14, the non-volatile memory component residing external to the controller.

16. A method for saving controller state and context data comprising:

utilizing an open operating system for a controller monitoring a power condition of the controller; and saving the controller state and context data from a volatile memory component to a flash memory component upon detecting a power loss condition.

17. The method of claim 16, further comprising generating an image of the controller state and context data.

18. The method of claim 17, further comprising determining integrity of the image.

19. The method of claim 18, further comprising restoring the image to the volatile memory upon a power up condition of the controller being detected.

20. The method of claim 16, the power loss condition being a power failure.

21. The method of claim 16, the power loss condition being a power suspend state.

22. The method of claim 16, the power loss condition being a normal controller shutdown condition.

23. A system that facilitates retention of data in an industrial controller that employs an open operating system, comprising:

a volatile memory component that stores controller state and context data;

a power monitoring component that monitors power state of the controller;

a non-volatile memory component;

a save component that senses a user initiated controller state and context save, and a processing component that generates an image of the controller state and context data from the volatile memory upon receiving a signal from the save component that a copy of the image is requested, and saves the image in the non-volatile memory component.

24. The system of claim 23, the non-volatile memory component being flash memory.

25. The system of claim 23, the non-volatile memory component being MRAM.

26. The system of claim 23, the processing component writing the image from the non-volatile memory back to the volatile memory upon receiving power resumption condition signal from the power monitoring component so as to restore the controller state and context information.

27. The system of claim 23 further comprising an image validation component that validates the image upon writing to the non-volatile memory and the volatile memory.

28. The system of claim 23 further comprising an image invalidate component that invalidates the information stored in the non-volatile memory.

29. An industrial controller comprising the system of claim 23.

30. An industrial automation process employing the system of claim 23.

31. A system that facilitates retention of data in an industrial controller that employs an open operating system, comprising:

means for monitoring power state of the controller;

means for sensing a user initiated controller state and context save, and means for generating an image of controller state and context data from volatile memory of the controller upon receiving a signal from the user initiated controller state and context save sensing means, and saving the image in a non-volatile memory component.

32. The system of claim 31, the non-volatile memory component being part of the controller.

33. The system of claim 31, the non-volatile memory component residing external to the controller.

34. A method for saving controller state and context data comprising:

utilizing an open operating system for a controller monitoring a power condition of the controller;

sensing a user initiated controller state and context save, and saving the controller state and context data from a volatile memory component to a flash memory component upon sensing a user initiated controller state and context save condition.

35. The method of claim 34, further comprising generating an image of the controller state and context data.

36. The method of claim 35, further comprising determining integrity of the image.

37. The method of claim 36, further comprising restoring the image to the volatile memory upon a power up condition of the controller being detected.

* * * * *